(12) United States Patent
Tanino et al.

(10) Patent No.: US 7,983,842 B2
(45) Date of Patent: Jul. 19, 2011

(54) VEHICULAR PRESENT POSITION DETECTION APPARATUS AND PROGRAM STORAGE MEDIUM

(75) Inventors: Hideki Tanino, Kariya (JP); Kiyoshi Tsurumi, Obu (JP); Hiroshige Asada, Nagoya (JP); Kenji Nakayama, Kanazawa (JP); Akihiro Hirano, Kanazawa (JP)

(73) Assignee: DENSO CORPORATION, Kariya (JP)

( * ) Notice: Subject to any disclaimer, the term of this patent is extended or adjusted under 35 U.S.C. 154(b) by 450 days.

(21) Appl. No.: 12/289,800

(22) Filed: Nov. 4, 2008

(65) Prior Publication Data

US 2009/0119016 A1      May 7, 2009

(30) Foreign Application Priority Data

Nov. 5, 2007    (JP) .................................. 2007-287454

(51) Int. Cl.
G01C 21/00     (2006.01)

(52) U.S. Cl. ........ 701/221; 701/214; 701/216; 701/217; 701/220

(58) Field of Classification Search .................. 701/216, 701/217, 220, 221, 224, 41, 42, 214; 702/94, 702/95, 141, 145, 150, 151
See application file for complete search history.

(56) References Cited

U.S. PATENT DOCUMENTS

| 6,253,154 B1 * | 6/2001 | Oshizawa et al. ............. 701/221 |
| 6,708,088 B2 * | 3/2004 | Matsuno et al. ................... 701/1 |
| 2009/0099728 A1 * | 4/2009 | Ichinose et al. ................. 701/39 |

FOREIGN PATENT DOCUMENTS

| JP | A-8-68655   | 3/1996 |
| JP | A-2000-55678 | 2/2000 |

* cited by examiner

*Primary Examiner* — Jack Keith
*Assistant Examiner* — Rami Khatib
(74) *Attorney, Agent, or Firm* — Posz Law Group, PLC

(57) ABSTRACT

There is a need for improving the accuracy of estimating a gain error for an angular velocity sensor. An error estimation section and a correction section are provided as well as a gyroscope that detects an angular velocity of a vehicle. The error estimation section assumes the gain error of the gyroscope to be a state quantity and finds an estimated value for the gain error using a Kalman filter. Based on the gain error found by the error estimation section, the correction section corrects a gain correction amount used for gain correction of values detected by the gyroscope. The correction section corrects the gain correction amount dedicated to right turn based on the gain error found by the error estimation section when the vehicle is assumed to turn right. The correction section corrects the gain correction amount dedicated to left turn based on the gain error found by the error estimation section when the vehicle is assumed to turn left.

7 Claims, 12 Drawing Sheets

$$P = \begin{bmatrix} 0 \\ 0 \ Ps\_left \ 0 \ 0 \ 0 \ 0 \\ 0 \\ 0 \\ 0 \\ 0 \end{bmatrix}$$

VEHICULAR PRESENT POSITION DETECTION APPARATUS AND PROGRAM STORAGE MEDIUM

CROSS REFERENCE TO RELATED APPLICATION

This application is based on and incorporates herein by reference Japanese Patent Application No. 2007-287454 filed on Nov. 5, 2007.

FIELD OF THE INVENTION

The present invention relates to a vehicular present position detection apparatus that uses a Kalman filter to find an estimated gain error of an angular velocity sensor.

BACKGROUND OF THE INVENTION

Patent Document 1: JP-10-246642 A (corresponding to U.S. Pat. No. 6,253,154)
Patent Document 2: JP-2000-55678 A A vehicular present position detection apparatus includes a car navigation system for detecting a present position of a vehicle. Conventionally, the vehicular present position detection apparatus generates a dead navigation locus (or dead reckoning trajectory) by combining a positioning receiver using a global navigation satellite system such as a GPS (Global Positioning System) with an autonomous sensor (or inertial sensor). The autonomous sensor is typified by a vehicle speed sensor or a gyroscope as an angular velocity sensor (or angular rate sensor). The vehicular present position detection apparatus collates or matches a dead navigation locus with map data to specify a position of the subject vehicle on a map.

Generally, the gyroscope detects a yaw rate of the vehicle. The vehicle speed sensor detects a travel distance. The vehicular present position detection apparatus uses the angular velocity (or yaw rate) and the travel distance to generate a motion vector of the vehicle. The vehicular present position detection apparatus integrates motion vectors to estimate a running locus (or trajectory) of the vehicle. Since the gyroscope or the vehicle speed sensor causes an error, however, a running locus may not be estimated correctly. Such errors include an offset error of the gyroscope, an angular velocity error (or yaw rate error) resulting from a gain error, and a distance coefficient error resulting from a change in a tire diameter.

For example, the technique described in Patent Document 1 estimates an offset error and then determines a running state of the vehicle whether the vehicle turns to the right, runs straight, or turns to the left. The technique directly uses a GPS positioning result for each state to correct gains and estimate left and right gain errors. However, such technique easily causes an error due to an error in the GPS positioning result.

Patent Document 2 proposes a technique that assumes such error to be a state quantity and finds an estimated state quantity using a Kalman filter. Such technique can appropriately detect a present position of the vehicle even when the GPS position result contains an error.

As shown in a graph of FIG. 14, the gyroscope generates an output such as a voltage in proportion to an angular velocity around a predetermined axis for detection. There is a need for representing a ratio (i.e., a graph slope) of converting the gyroscope output into the angular velocity. To do this, a predetermined proportional constant (conversion gain) is used to convert the gyroscope output into the angular velocity. The converted values are integrated to find a direction variation of the vehicle.

The technique described in Patent Document 2 uses the same left and right gain characteristics for the gyroscope as shown in FIG. 14. That is, the same system is used to continuously estimate gain errors independently of whether the vehicle runs straight or turns to the left or right.

Generally, however, an actual gyroscope indicates different gain (or asymmetry gain) characteristics (different left and right sensitivities) for left and right turns as depicted by a broken line in FIG. 15. The technique of Patent Document 2 generates an angular velocity error in left and right turns and degrades the accuracy of estimating a gain error.

A Kalman filter may be used to estimate gain errors for left and right turns independently. An increase of one variable complicates a Kalman filter process.

SUMMARY OF THE INVENTION

The present invention has been made in consideration of the foregoing. It is therefore an object of the present invention to improve accuracy of estimating a gain error for an angular velocity sensor.

To achieve the above-mentioned object, as an example of the present invention, a vehicular present position detection apparatus is provided as follows. In the apparatus, an angular velocity sensor detects an angular velocity of a vehicle. An error estimation portion is configured to assume a gain error of the angular velocity sensor to be a state quantity and find an estimated gain error using a Kalman filter. A turn direction determination portion is configured to determine a turn direction of the vehicle. A correction amount adjustment portion is configured to correct a gain correction amount used for gain correction of an angular velocity detected by the angular velocity sensor based on an estimated gain error found by the error estimation portion. Herein, the correction amount adjustment portion is further configured to correct a first gain correction amount, which is dedicated to right turn, based on the estimated gain error when the turn direction determination portion determines a right turn; the correction amount adjustment portion is further configured to correct a second gain correction amount, which is dedicated to left turn, based on the estimated gain error when the turn direction determination portion determines a left turn.

As another example of the present invention, a program storage medium containing instructions readable and executable by a computer, the instruction for causing the computer to function as the portions included in the above vehicular present position detection apparatus.

As yet another example of the present invention, a method is provided for adjusting a correction amount for an angular velocity sensor for a vehicle. The method comprises: assuming a gain error of the angular velocity sensor to be a state quantity and finding an estimated gain error using a Kalman filter; determining a turn direction of the vehicle; and correcting, based on the estimated gain error, (i) a first gain correction amount being dedicated to right turn, the first gain correction amount being used for gain correction of an angular velocity detected by the angular velocity sensor, when a turn direction is determined to be right turn, and (ii) a second gain correction amount being dedicated to left turn, the second gain correction amount being used for gain correction of an angular velocity detected by the angular velocity sensor, when a turn direction is determined to be left turn.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention will be described in further detail with reference to the accompanying drawings.

1. First Embodiment

The following describes a car navigation system (hereafter referred to simply as a navigation system) as a vehicular present position detection apparatus according to a first embodiment of the present invention.

(1-1. Overall Configuration)

Figure 1:
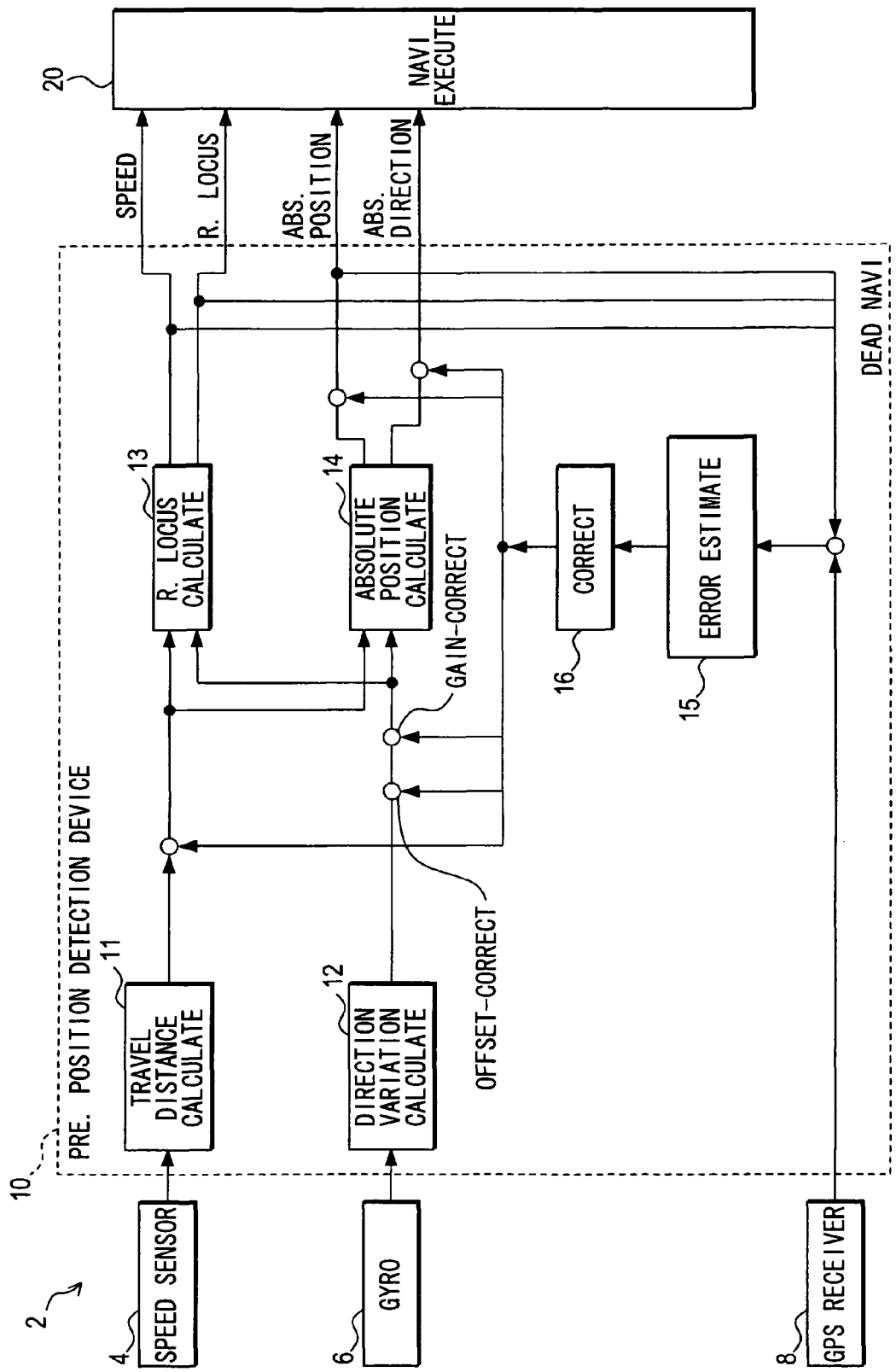
FIG. 1 is a block diagram showing an overall configuration of an apparatus according to an embodiment of the present invention.

FIG. 1 is a block diagram showing an overall configuration of a navigation system 2 according to the first embodiment.

As shown in FIG. 1, the navigation system 2 is provided in a subject vehicle and includes a vehicle speed sensor 4, a gyroscope 6, a GPS receiver 8, a present position detecting device 10, and a navigation execution device 20.

The vehicle speed sensor 4 detects a running speed of the vehicle and generates a pulse signal at an interval corresponding to the speed.

The gyroscope 6 detects an angular velocity (direction variation) of the vehicle and generates a detection signal corresponding to the angular velocity for rotational motion applied to the vehicle.

The GPS receiver 8 receives a radio wave transmitted from an artificial satellite for the global-positioning system (GPS) via a GPS antenna and detects a position, direction (running direction), and speed of the vehicle.

The present position detecting device 10 detects dead navigation data such as the present position or the traveling direction of the vehicle based on outputs from the vehicle speed sensor 4, the gyroscope 6, and the GPS receiver 8.

Based on a detection result from the present position detecting device 10, the navigation execution device 20 displays the position of the subject vehicle on a map of a display screen (not shown) or provides route guidance to a specified destination.

The present position detecting device 10 and the navigation execution device 20 are implemented as processes of an electronic control unit (ECU) whose major component is a microcomputer. Specifically, the present position detecting device 10 includes a travel distance calculation section 11, a direction variation calculation section 12, a relative locus calculation section 13, an absolute position calculation section 14, an error estimation section 15, and a correction section 16.

The travel distance calculation section 11 calculates a travel distance of the vehicle based on a pulse signal from the vehicle speed sensor 4.

The direction variation calculation section 12 calculates a direction variation based on a detection signal from the gyroscope 6.

The relative locus calculation section 13 calculates a relative locus and a vehicle speed based on a travel distance calculated by the travel distance calculation section 11 and a direction variation calculated by the direction variation calculation section 12.

Similarly to the relative locus calculation section 13, the absolute position calculation section 14 calculates an absolute direction and an absolute position based on a travel distance calculated by the travel distance calculation section 11 and a direction variation calculated by the direction variation calculation section 12.

The error estimation section 15 includes a Kalman filter. The error estimation section 15 generates an observation value in the form of a difference between the values calculated by the relative locus calculation section 13 and the absolute position calculation section 14 and the value detected by the GPS receiver 8. The error estimation section 15 assumes a state quantity using errors in parameters used for the calculation of the vehicle speed, direction, and position or calculation results. The error estimation section 15 finds an estimated value for the state quantity.

The correction section 16 corrects parameters or values resulting from the calculation sections 11 through 14 in accordance with the estimated value for the state quantity or the error calculated by the error estimation section 15.

(1-2. Kalman Filter)

The navigation system 2 according to the embodiment uses the Kalman filter for combining the dead navigation with the GPS. The following describes an overview of the Kalman filter included in the error estimation section 15.

(1-2-1. Overview of the Kalman Filter)

The Kalman filter uses state quantity x that represents an error signal to be estimated. The following state equation updates the state quantity.

(Expression 1)

$$x(t+1) = A(t+1,t) \cdot x(t) + v(t) \quad \text{equation (1)}$$

x(t): State quantity or an error in the dead navigation.
A(t+1,t): State transition matrix.
v(t): Noise generated during state quantity generation.

Figure 2:
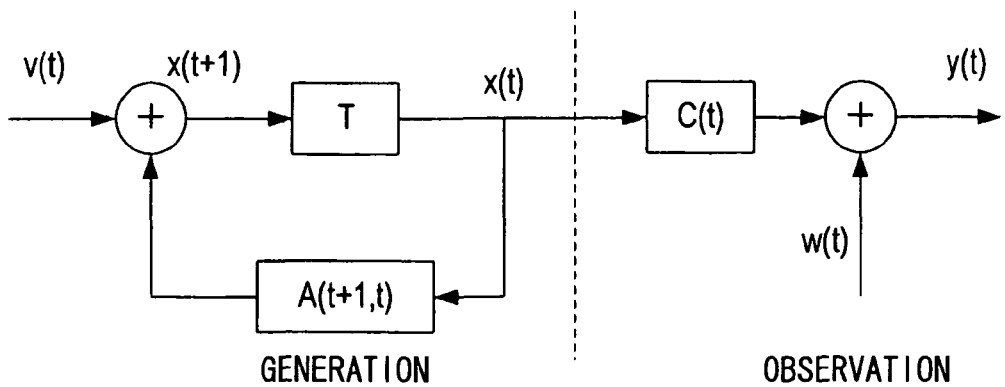
FIG. 2 is a signal flow graph of a Kalman filter.

The observation process is further represented as follows.
(Expression 2)

$$y(t) = C(t) \cdot x(t) + \omega(t) \quad \text{equation (2)}$$

y(t): Observation signal.
C(t): Observation matrix.
ω(t): Noise generated during observation.
FIG. 2 is a signal flow graph showing the relation between equations (1) and (2).
(1-2-2. Estimating the State Quantity from an Observation Signal)
The Kalman filter uses an observation signal to perform least-squares estimation on the state quantity in accordance with the following cyclic calculation.
(Expression 3)

$$p(t|t-1) = A(t|t-1)p(t-1|t-1)A^T(t|t-1) + V(t) \quad \text{equation (3)}$$

$$G(t) = P(t|t-1)C^T\{CP(t|t-1)C^T + W(t)\}^- \quad \text{equation (4)}$$

$$\hat{x}(t|y_{t-1}) = A(t|t-1)\hat{x}(t-1|y_{t-1}) \quad \text{equation (5)}$$

$$\hat{x}(t|y_t) = \hat{x}(t|y_{t-1}) + G(t)\{y(t) - C\hat{x}(t|y_{t-1})\} \quad \text{equation (6)}$$

$$P(t|t) = P(t|t-1) - G(t)CP(t|t-1) \quad \text{equation (7)}$$

where G(t) denotes a Kalman gain, P(t|t−1) an estimated error covariance for the state quantity x, P(t|t) an error covariance, V(t) a covariance matrix for noise v(t), and W(t) a covariance matrix for noise w(t).

The Kalman filter estimates an error in the dead navigation as the state quantity from the observation signal. The estimated value for the error is fed back to the dead navigation for correction. The prior estimated value x(t|y$_{t-1}$) in equation (5) can be assumed to be zero. Accordingly, equation (6) can be modified to equation (8) as follows.

(Expression 4)

$$\hat{x}(t|y_t) = G(t)y(t) \quad \text{equation (8)}$$

(1-3. Dead Navigation Modeling and Kalman Filter Formulation)
The following describes dead navigation modeling and Kalman filter formulation.
The embodiment applies the Kalman filter to the dead navigation. The following describes dead navigation modeling for Kalman filter formulation, settling a state quantity and an observation signal as appropriate, and settling a state equation and an observation equation.

The dead navigation includes four portions: the vehicle speed sensor 4, the gyroscope 6, the relative locus calculation section 13, and the absolute position calculation section 14.
(1-3-1. Modeling a State Quantity Generation Process)
The Kalman filter for the dead navigation uses the following six errors as the state quantity x.
(Expression 5)
1. Offset Error (εG)

$$\epsilon G_t = \epsilon G_{t-1} + \epsilon_0 \quad \text{equation (9)}$$

2. Gain Error (εS)

$$\epsilon S_t = \epsilon S_{t-1} + \epsilon_1 \quad \text{equation (10)}$$

3. Absolute Direction Error (εθ)

$$\epsilon \theta_t = T \cdot \epsilon G_{t-1} + D \cdot \epsilon \theta_{t-1} + \epsilon_2 \quad \text{equation (11)}$$

4. Distance Coefficient Error (εK)

$$\epsilon K_t = \epsilon K_{t-1} + \epsilon_3 \quad \text{equation (12)}$$

5. Absolute Direction North Error (εY)

$$\epsilon Y_t = \sin(\theta) \cdot L \cdot (1 - \epsilon K_{t-1}) - \sin(\theta_T) \cdot L + \epsilon Y_{t-1} \quad \text{equation (13)}$$

6. Absolute Direction East Error (εX)

$$\epsilon X_t = \cos(\theta) \cdot L \cdot (1 - \epsilon K_{t-1}) - \cos(\theta_T) \cdot L + \epsilon X_{t-1} \quad \text{equation (14)}$$

where $\theta = \theta_T + \epsilon \theta_{t-1} + T \cdot \epsilon G_{t-1}/2 + D \cdot \epsilon S_{t-1/2}$
In the equations, θ$_T$ denotes the true absolute direction, D the inherited direction variation, L the inherited travel distance, and T the inherited elapsed time. θ denotes absolute direction θ resulting from the absolute direction θ$_T$ supplemented with a sensor error and is found from the direction variation.

When the equations (9) through (14) are partially differentiated by the state quantity, the state quantity generation process is expressed as follows. (Expression 6)

$$x(t+1) = A(t+1, t)x(t) + \quad \text{equation (15)}$$

$$v(t)\begin{bmatrix} \epsilon G_{t+1} \\ \epsilon S_{t+1} \\ \epsilon \theta_{t+1} \\ \epsilon K_{t+1} \\ \epsilon Y_{t+1} \\ \epsilon X_{t+1} \end{bmatrix} = \begin{bmatrix} 1 & 0 & 0 & 0 & 0 & 0 \\ 0 & 1 & 0 & 0 & 0 & 0 \\ T & D & 1 & 0 & 0 & 1 \\ 0 & 0 & 0 & 1 & 0 & 0 \\ \cos(\theta) \cdot T \cdot L/2 & \cos(\theta) \cdot D \cdot L & \cos(\theta) \cdot L & \sin(\theta) \cdot L & 1 & 0 \\ -\sin(\theta) \cdot T \cdot L/2 & -\sin(\theta) \cdot D \cdot L & -\sin(\theta) \cdot L & \cos(\theta) \cdot L & 0 & 1 \end{bmatrix}$$

$$\cdot \begin{bmatrix} \epsilon G_t \\ \epsilon S_t \\ \epsilon \theta_t \\ \epsilon K_t \\ \epsilon Y_t \\ \epsilon X_t \end{bmatrix} + \begin{bmatrix} \epsilon_0 & 0 & 0 & 0 & 0 & 0 \\ 0 & \epsilon_1 & 0 & 0 & 0 & 0 \\ 0 & 0 & \epsilon_2 & 0 & 0 & 0 \\ 0 & 0 & 0 & \epsilon_3 & 0 & 0 \\ 0 & 0 & 0 & 0 & 0 & 0 \\ 0 & 0 & 0 & 0 & 0 & 0 \end{bmatrix}$$

where $\epsilon_0$ denotes the offset noise (offset variation due to a temperature drift), $\epsilon_1$ the gain noise (gyroscope gain variation due to a temperature drift), $\epsilon_2$ the absolute direction noise (variation due to gyroscope cross coupling), and $\epsilon_3$ the distance coefficient noise (variation due to a temporal change in the speed sensor).

(1-3-2. Modeling an Observation Process)
The observation value is found by using a difference between the dead navigation output and the GPS output. Each output contains an error. The observation value provides a sum of the dead navigation error and the GPS error.

Observation value y is associated with state quantity x and is modeled as follows. (Expression 7)

$$y(t) = C(t)x(t) + \qquad \text{equation (16)}$$

$$v(t) \begin{bmatrix} \epsilon\theta_{DRt} - \epsilon\theta_{GPSt} \\ \epsilon K_{DRt} - \epsilon K_{GPSt} \\ \epsilon Y_{DRt} - \epsilon Y_{GPSt} \\ \epsilon X_{DRt} - \epsilon X_{GPSt} \end{bmatrix} = \begin{bmatrix} 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \cdot \begin{bmatrix} \epsilon G_t \\ \epsilon S_t \\ \epsilon \theta_t \\ \epsilon K_t \\ \epsilon Y_t \\ \epsilon X_t \end{bmatrix} +$$

$$\begin{bmatrix} -\epsilon\theta_{GPSt} \\ -\epsilon K_{GPSt} \\ -\epsilon Y_{GPSt} \\ -\epsilon X_{GPSt} \end{bmatrix}$$

where subscript DRt denotes a value found by the dead navigation based on signals from the vehicle speed sensor and the gyroscope at time t; and GPSt denotes a value output from the GPS at time t.

(1-3-3. Settling an Observation Signal)

In equation (16), $(\epsilon\theta_{DRt} - \epsilon\theta_{GPSt})$ denotes a difference between the absolute direction found by the dead navigation and the direction output from the GPS. The absolute direction found by the dead navigation contains the true absolute direction and error $\epsilon\theta_{DRt}$. The direction output from the GPS contains the true absolute direction and error $\epsilon\theta_{GPSt}$. Finding a difference between these yields $(\epsilon\theta_{DRt} - \epsilon\theta_{GPSt})$.

Likewise, $(\epsilon K_{DRt} - \epsilon K_{GPSt})$ denotes a distance coefficient error found from a difference between the speed found by the dead navigation and the speed output from the GPS. $(\epsilon Y_{DRt} - \epsilon Y_{GPSt})$ and $(\epsilon X_{DRt} - \epsilon X_{GPSt})$ respectively denote differences in Y and X component errors between the absolute position found by the dead navigation and the absolute position output from the GPS.

(1-3-4. Noise Generated During the Observation Process)

In equation (16), a GPS noise v is generated during the observation process and is defined as follows.

A pseudo distance in the GPS indicates the relation between User Equivalent Range Error (UERE) and Horizontal Dilution of Precision (HDOP). According to the relation, the positioning accuracy is found by UERE×HDOP. The positioning accuracy is squared to find $\epsilon Y_{GPSt}$ and $\epsilon X_{GPSt}$.

The speed accuracy is found by multiplying a measurement error in Doppler frequencies by HDOP according to the relation between the error and HDOP. The speed accuracy is divided by the vehicle speed to find a distance coefficient error. The distance coefficient error is squared to find $\epsilon K_{GPSt}$.

Speed Vc and the speed accuracy of the vehicle are used to find the direction accuracy based on $\tan^{-1}$(speed accuracy/Vc). The direction accuracy is squared to find $\epsilon\theta_{GPSt}$. Performing the calculations on the Kalman filter finds the state quantity x representing the six error values defined in the state quantity generation process. The values are used to correct the distance coefficient of the vehicle speed sensor, the gyroscope offset, gain, absolute position, and absolute direction.

(1-4. Process Performed by the Present Position Detecting Section)

Figure 3:
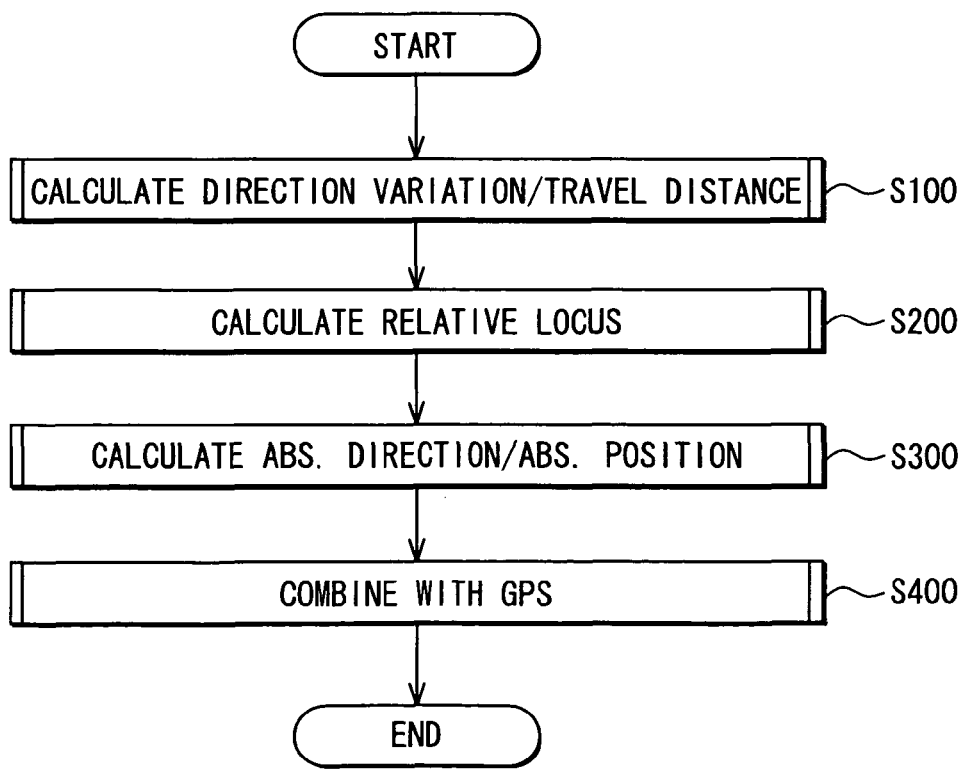
FIG. 3 is a flow chart showing a dead navigation process.

With reference to a flow chart in FIG. 3, the following describes a dead navigation process the present position detecting device 10 repeatedly performs at a given cycle $T_M$. The CPU in the electronic control unit executes the present process in accordance with a program stored in ROM.

The dead navigation process starts and, at S100, performs a direction variation and travel distance calculation process equivalent to the travel distance calculation section 11 and the direction variation calculation section 12.

Figure 4:
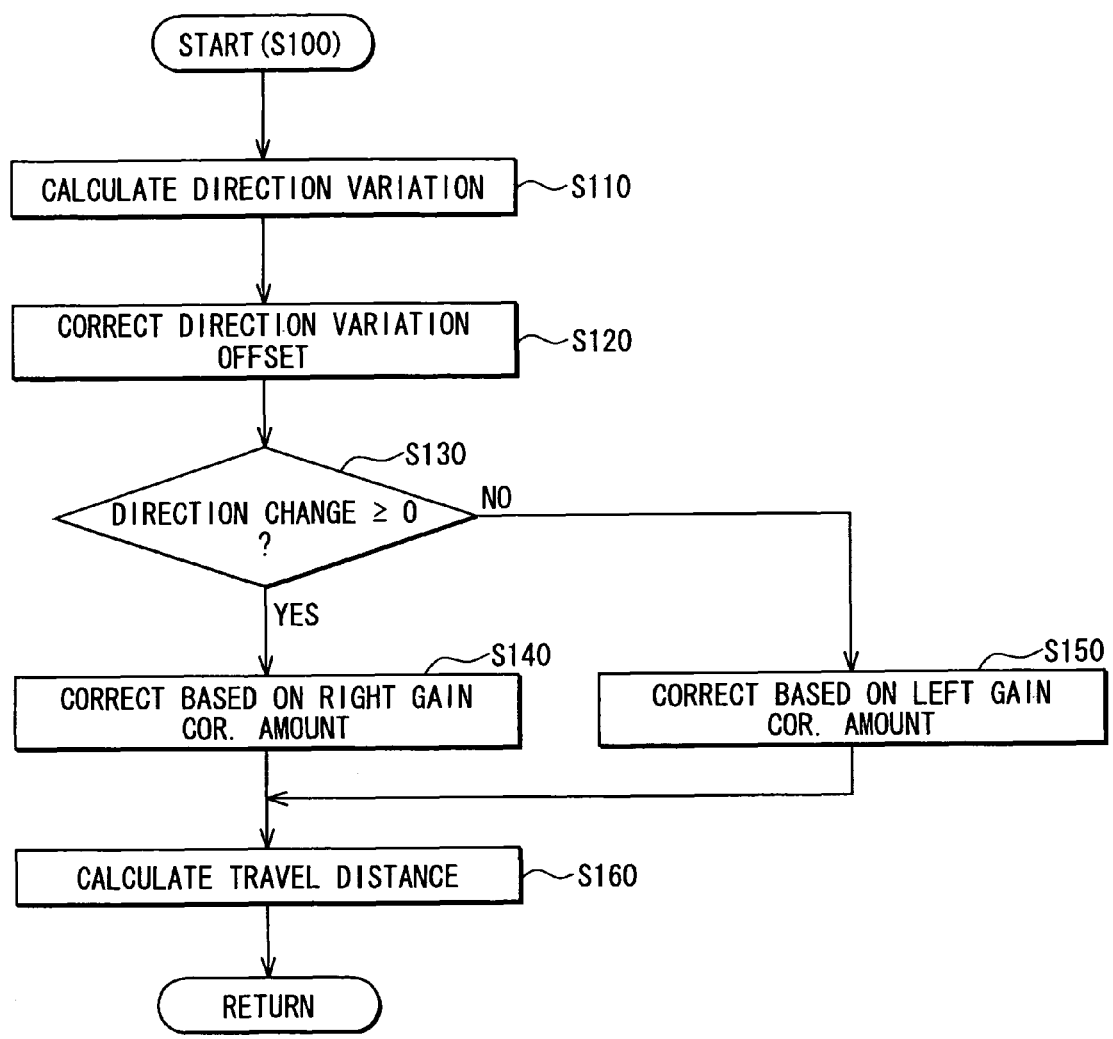
FIG. 4 is a flow chart showing a direction variation and travel distance calculation process.

This process will be described in more detail with reference to FIG. 4.

At S110, the process calculates a direction variation by multiplying a gyroscope output angular velocity detected by the gyroscope 6 and the activation cycle $T_M$ of the main routine together.

$$\text{Direction variation} = (\text{gyroscope output angular velocity}) \times T_M \qquad \text{equation (17)}$$

Figures 13, 14:
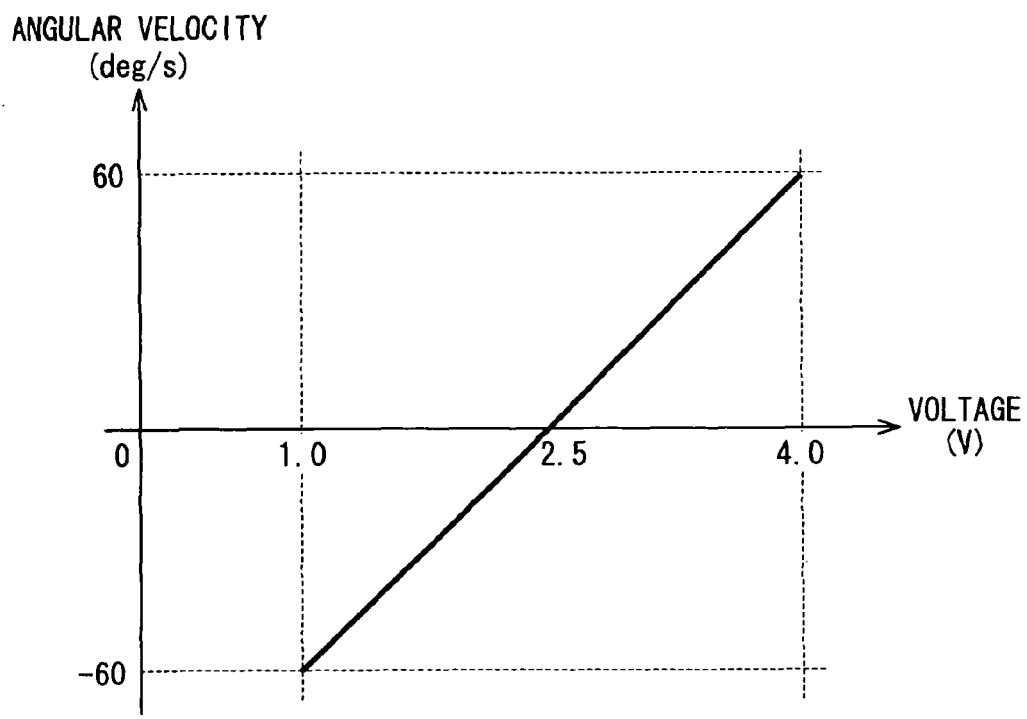
FIG. 13 is an explanatory diagram showing an error covariance matrix with value 0 assigned to cross-correlation elements corresponding to gain errors.
FIG. 14 is a graph showing relation between a gyroscope output and an angular velocity of a prior art.
Figure 15:
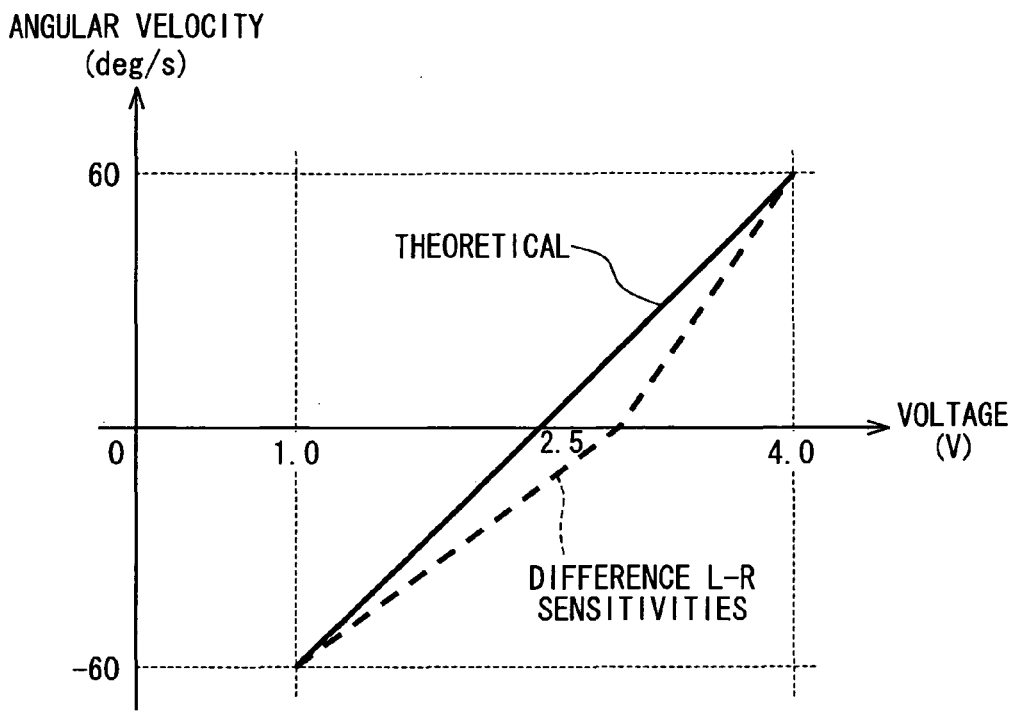
FIG. 15 is a graph of a gyroscope having different left and right gain characteristics of a prior art.

As seen from a graph in FIG. 14, the gyroscope output angular velocity is calculated by subtracting an offset value (2.5 V in FIG. 14) from a sampled output from the gyroscope 6 and multiplying the result by a conversion gain (equivalent to the graph slope). The conversion gain is assumed to be an ideal value defined in sensor specifications for the gyroscope 6.

At S120, the process corrects a direction variation offset by multiplying an offset correction amount (to be described) and the activation cycle $T_M$ of the main routine together and subtracting the result from the direction variation found at S110.

$$\text{Direction variation} = (\text{direction variation}) - (\text{offset correction amount}) \times T_M \qquad \text{equation (18)}$$

Figure 5:
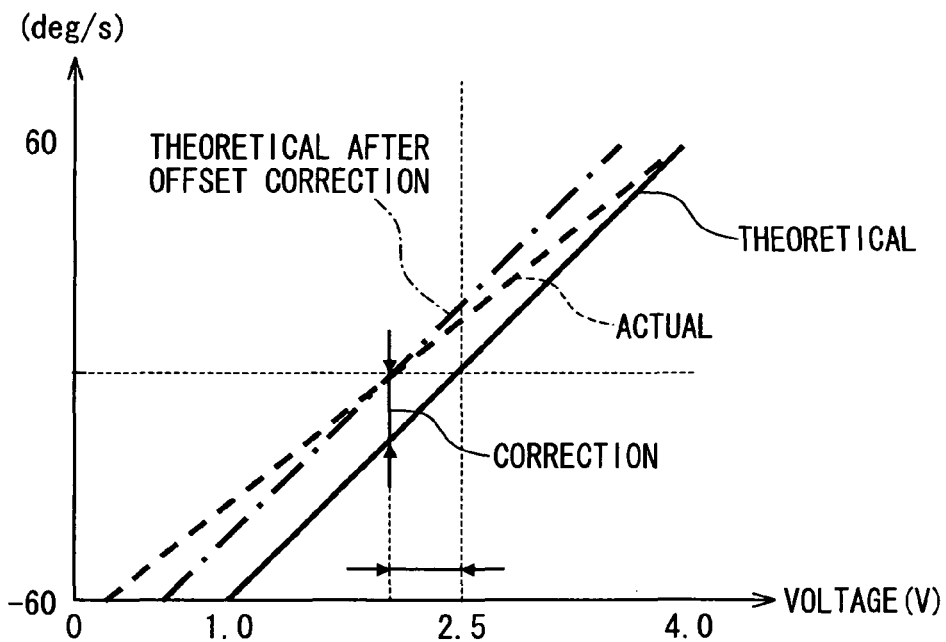
FIG. 5 is an explanatory diagram showing gyroscope offset correction.

As shown in FIG. 5, the process corrects an error based on a variation in output voltage (zero point) of the gyroscope 6 corresponding to angular velocity 0 (deg/sec).

Figure 6:
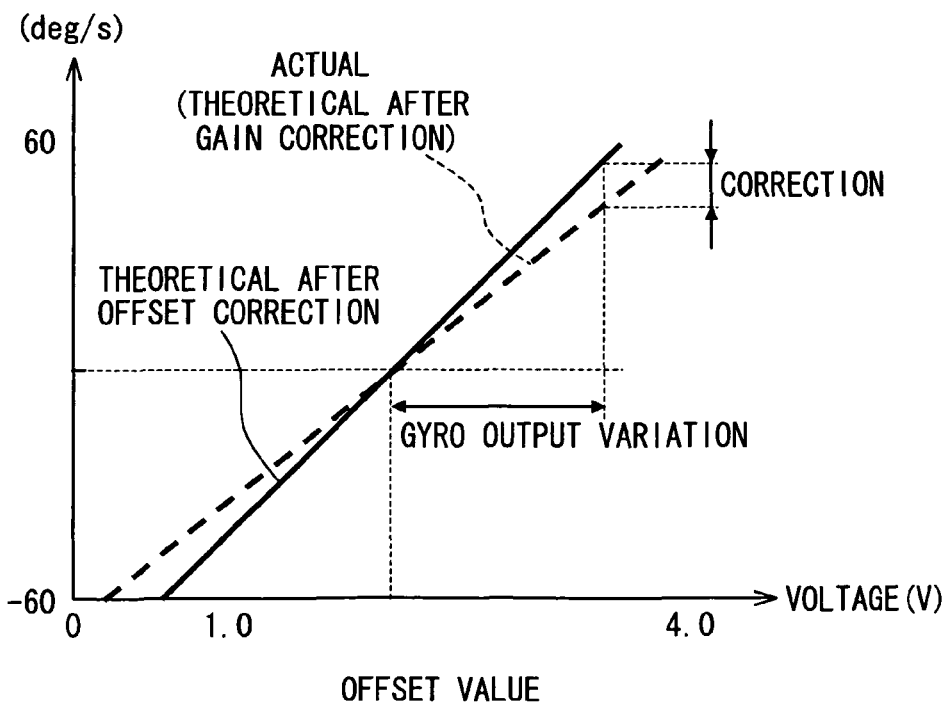
FIG. 6 is an explanatory diagram showing gyroscope gain correction.

At S130 through S150, the process applies gain correction to the direction variation by multiplying the direction variation offset-corrected at S120 and a gain correction amount (to be described) together. As shown in FIG. 6, the process corrects an error based on a variation in the graph slope (conversion gain).

The embodiment uses two different gain correction amounts (gain correction coefficients) corresponding to turn directions. Specifically, the right turn uses a dedicated gain correction amount (hereafter referred to as a right gain correction amount or a first gain correction amount) $\epsilon S\_\text{right}$. The left turn uses a dedicated gain correction amount (hereafter referred to as a left gain correction amount or a second gain correction amount) $\epsilon S\_\text{left}$.

At S130, the process determines whether or not a direction change (angular velocity) in the vehicle is greater than or equal to 0. The positive angular velocity is assumed to be the right turn. The negative angular velocity is assumed to be the left turn.

When it is determined at S130 that the direction change in the vehicle is greater than or equal to 0 (right turn), the process proceeds to S140 and corrects the gain based on the right gain correction amount.

$$\text{Direction variation} = (\text{direction variation}) \times (\epsilon S\_\text{right}(t)) \qquad \text{equation (19a)}$$

When it is determined at S130 that the direction change in the vehicle is smaller than 0 (left turn), the process proceeds to S150 and corrects the gain based on the left gain correction amount.

$$\text{Direction variation} = (\text{direction variation}) \times (\epsilon S\_\text{left}(t)) \qquad \text{equation (19b)}$$

At S160, the process calculates the travel distance by multiplying the number of pulses output from the vehicle speed sensor 4 by a distance coefficient (to be described). The number of pulses is detected during a period between the second last execution and the last execution of the process.

The direction variation and travel distance calculation process then terminates.

Travel distance=(Number of vehicle speed sensor pulses)×(distance coefficient)  equation (20)

At S200 in FIG. 3, the process performs a relative locus calculation process equivalent to the relative locus calculation section 13.

Figure 7:
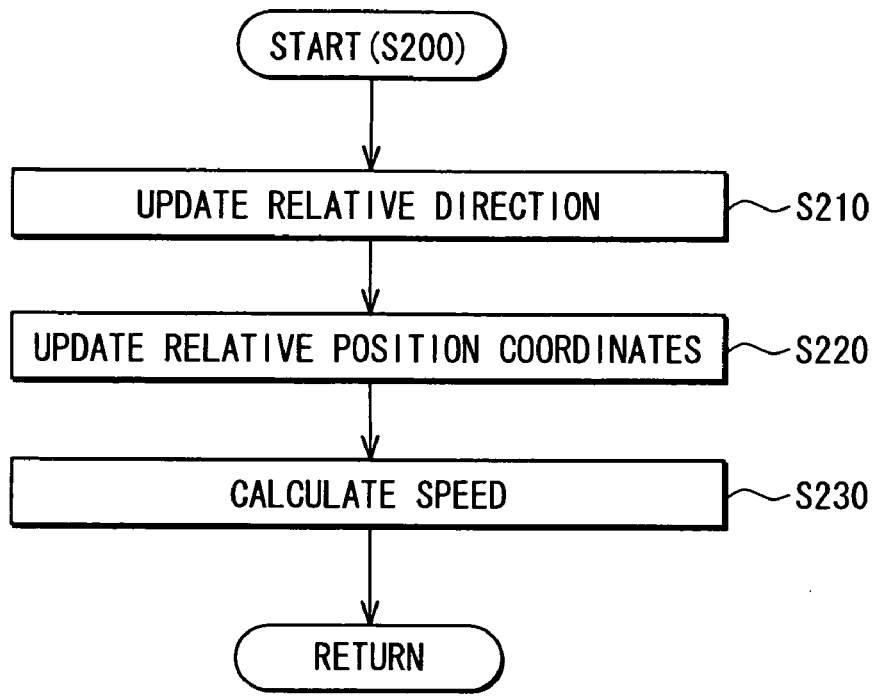
FIG. 7 is a flow chart showing a relative locus calculation process.

The process will be described in detail with reference to FIG. 7.

At S210, the process updates the relative direction by adding the direction variation calculated at S140 or S150 to the existing relative direction.

Relative direction=relative direction+direction variation  equation (21)

At S220, the process updates relative position coordinates based on the updated relative direction and the travel distance calculated at S160. Specifically, the process updates relative coordinates rel.x and rel.y in accordance with equation (22). The relative coordinate rel.x uses a north-south direction as the x axis. The relative coordinate rel.x uses an east-west direction as the y axis. In the equation, $\theta s$ denotes the relative direction calculated at S210.

rel.x=rel.x+(travel distance)×cos($\theta s$)

rel.y=rel.y+(travel distance)×sin($\theta s$)  equation (22)

The update is performed by adding X and Y components of the relative direction with reference to the travel distance to the existing relative position coordinates. The relative position coordinate is calculated so as to find a relative locus. So-called map matching is performed based on the relation between the relative locus and a road shape.

At S230, the process calculates the vehicle speed by dividing the travel distance calculated at S160 by the activation cycle $T_M$ of the main routine. The relative locus calculation process then terminates.

Vehicle speed=travel distance/$T_M$  equation (23)

At S300 in FIG. 3, the process performs an absolute direction and absolute position calculation process equivalent to the absolute position calculation section 14.

Figure 8:
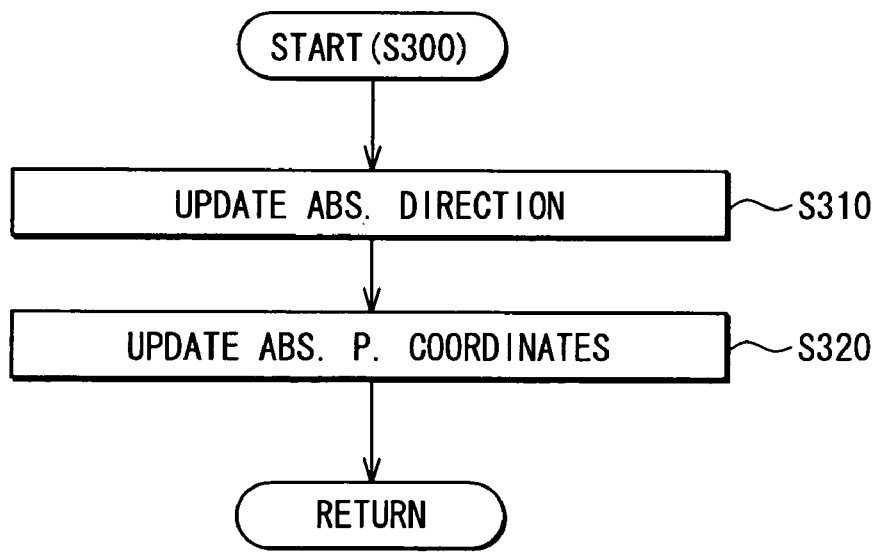
FIG. 8 is a flow chart showing an absolute direction and position calculation process.

The process will be described in detail with reference to FIG. 8.

At S310, the process updates the absolute direction by adding the direction variation calculated at S140 or S150 to the existing absolute direction.

Absolute position=absolute position+direction variation  equation (24)

At S320, the process updates absolute position coordinates based on the updated absolute direction and the travel distance calculated at S160. Specifically, the process updates absolute coordinates abs.x and abs.y in accordance with equation (25). The absolute coordinate abs.x uses a north-south direction as the x axis. The absolute coordinate abs.x uses an east-west direction as the y axis. In the equation, 0 denotes the absolute direction calculated at S310.

abs.x=abs.x+(travel distance)×cos($\theta$)

abs.y=abs.y+(travel distance)×sin($\theta$)  equation (25)

The update is performed by adding X and Y components of the absolute direction with reference to the travel distance to the existing absolute position coordinates. The updated absolute direction and absolute position are used for a GPS combination process for to be described later.

At S400 in FIG. 3, the process finally performs the GPS combination process equivalent to the error estimation section 15 and the correction section 16.

The process will be described in detail with reference to FIG. 9.

At S410, the process determines whether or not T1 seconds have elapsed after the last execution of the Kalman filter process (S430 through S520) based on GPS positioning data to be described or the last execution of an estimation calculation process (S530 and S540). When the determination result is negative, the process proceeds to S420.

At S420, the process determines whether or not the GPS receiver 8 performs positioning and supplies GPS positioning data. When the determination result is affirmative, the process proceeds to S430 and performs a process using the Kalman filter. When the determination result is negative, the process terminates.

At S430, the process calculates observation value y ($\epsilon K_{DRt} - \epsilon K_{GPSt}$, $\epsilon \theta_{DRt} - \epsilon \theta_{GPSt}$, $\epsilon Y_{DRt} - \epsilon Y_{GPSt}$, and $\epsilon X_{DRt} - \epsilon X_{GPSt}$) based on GPS positioning data (speed, position, and direction) from the GPS receiver 8 and the dead navigation data (vehicle speed at S230, absolute position at S320, and absolute direction at S310) calculated by the above-mentioned dead navigation process. In addition, the process calculates noise w(t) generated in the observation based on the GPS positioning data from the GPS receiver 8.

At S440, the process calculates state transition matrix A using equation (15). The equation contains travel distance L and elapsed time T from the last point of calculating the process matrix. An unshown calculation process is used to find travel distance L and elapsed time T. The absolute direction $\theta$ is found at S310.

The process finds state quantity x based on the calculated observation value y and state transition matrix A.

At S450, the process estimates error covariance P using equation (3). At S460, the process calculates Kalman gain G using equation (4). At S470, the process calculates error covariance P using equation (7). At S480, the process finds state quantity x based on Kalman gain G and observation value y. State quantity x represents offset errors $\epsilon G$ and $\epsilon S$, absolute direction error $\epsilon \theta$, distance coefficient error $\epsilon K$, absolute position north error $\epsilon Y$, and absolute position east error $\epsilon X$ at the left side of equation (15).

At S490 through S520, the process corrects the dead navigation errors (offset and gain of the gyroscope 6, and distance coefficient, absolute direction, and absolute position of the vehicle speed sensor 4) based on the error values $\epsilon G$, $\epsilon S$, $\epsilon K$, $\epsilon \theta$, $\epsilon Y$, and $\epsilon X$ calculated as state quantity x.

Offset correction amount=(offset correction amount)−$\epsilon G$  equation (26)

Distance coefficient=(distance coefficient)×(1−$\epsilon K$)  equation (27)

Absolute direction=(absolute direction)−$\epsilon \theta$  equation (28)

abs.y(absolute position)=abs.y−$\epsilon Y$ abs.x(absolute position)=abs.x−$\epsilon X$  equation (29)

At S490, the process corrects the offset of the gyroscope 6 using equation (26) to correct the offset correction amount used at S120. The process corrects the distance coefficient of the vehicle speed sensor 4 using equation (27) to correct the distance coefficient used at S160. The process corrects the absolute direction using equation (28) to correct the absolute direction $\theta$ used at S310. The process corrects the absolute position using equation (29) to correct the absolute position used at S320.

At S500 through S520, the process corrects the gain due to the dead navigation error based on the error value ϵS calculated as state quantity x.

At S500, the process determines whether or not a direction change in the vehicle is greater than or equal to 0, that is, whether or not the vehicle turns to the right. The determination result at S130 may be used as is.

When it is determined at S500 that the direction change in the vehicle is greater than or equal to 0 (right turn), the process proceeds to S510 and corrects the gain using equation (30a) to correct the gain correction amount used at S140.

$$\epsilon S\_right(t+1) = (\epsilon S\_right(t)) \times (1-\epsilon S) \quad \text{equation (30a)}$$

When it is determined at S500 that the direction change in the vehicle is smaller than 0 (left turn), the process proceeds to S520 and corrects the gain using equation (30b) to correct the gain correction amount used at S150.

$$\epsilon S\_left(t+1) = (\epsilon S\_left(t)) \times (1-\epsilon S) \quad \text{equation (30b)}$$

The process repeats S430 through S520 each time the GPS receiver 8 supplies GPS positioning data. The process corrects errors by independently estimating left and right gains to acquire more accurate dead navigation data.

The determination result may be affirmative at S410 when the GPS receiver 8 supplies no GPS positioning data for a long time such as T1 seconds or longer. In such case, the process proceeds to S530 and S540 to calculate state transition matrix A and estimate error covariance P. The reason follows. When no GPS positioning data is supplied from the GPS receiver 8, making no correction increases an error. Periodically estimating at least error covariance P makes it possible to accurately perform the Kalman filter process when GPS positioning data is supplied from the GPS receiver 8 afterwards.

(1-5. Simulation)

The following describes a simulation result from the navigation system 2 according to the embodiment.

As running conditions, the vehicle is accelerated from 0 km/h to 45 km/h and then turns to the left and right twice alternately at the constant speed. The gain of the gyroscope 6 is multiplied by 1.1 to the left and by 0.9 to the right.

Figure 10A:
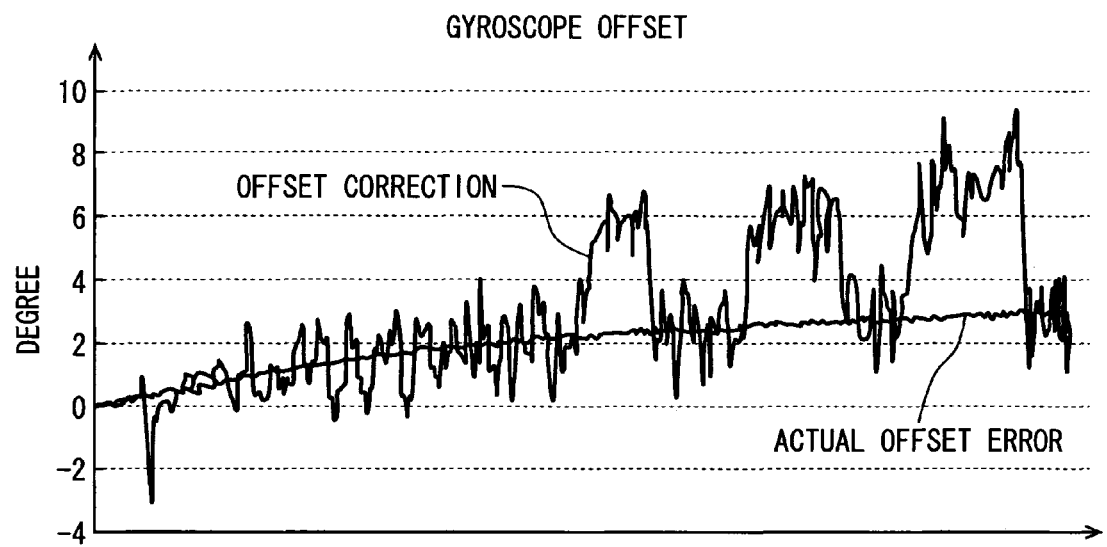
FIGS. 10A, 10B are graphs showing results of simulating relation between an offset error and a correction amount and relation between a gain error and an estimated value for the gyroscope, respectively, as comparative examples according to a conventional technique.
Figure 10B:
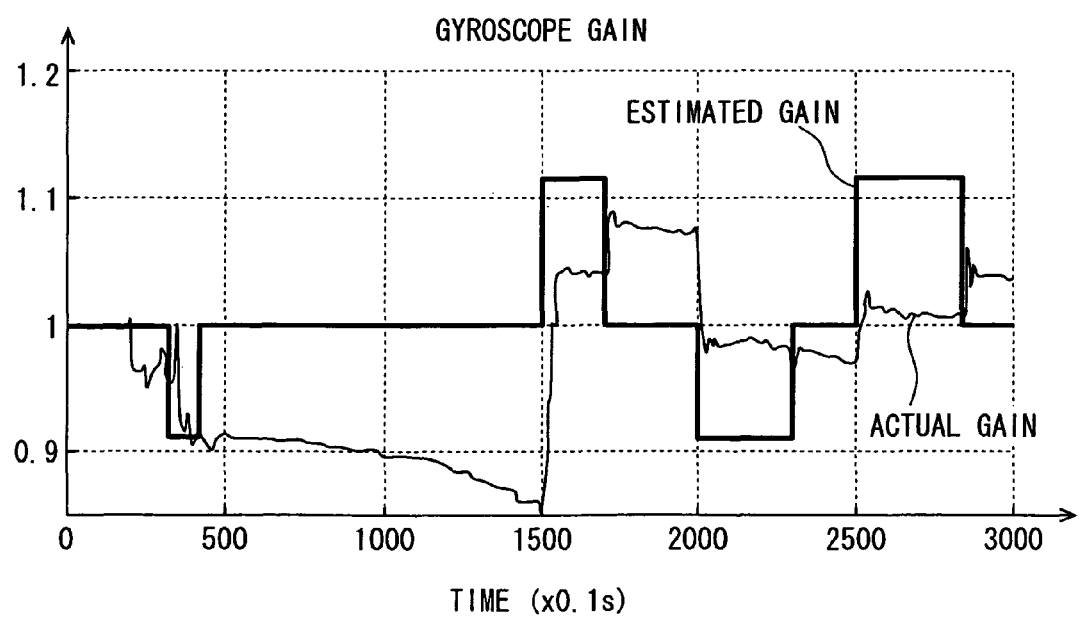
Figure 11A:
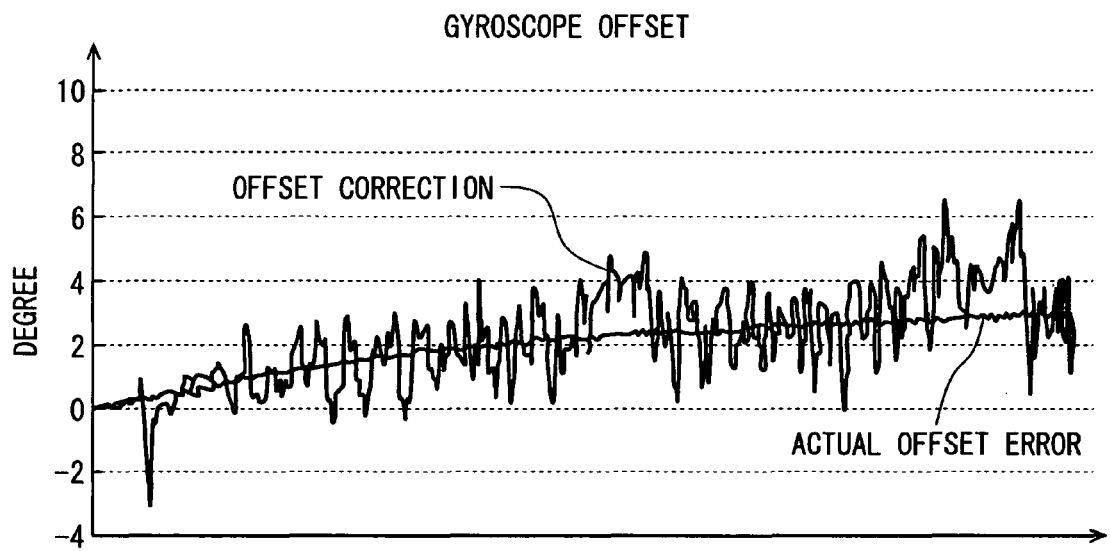
FIGS. 11A, 11B are graphs showing results of simulating relation between an offset error and a correction amount and relation between a gain error and an estimated value for the gyroscope, respectively, according to the embodiment.
Figure 11B:
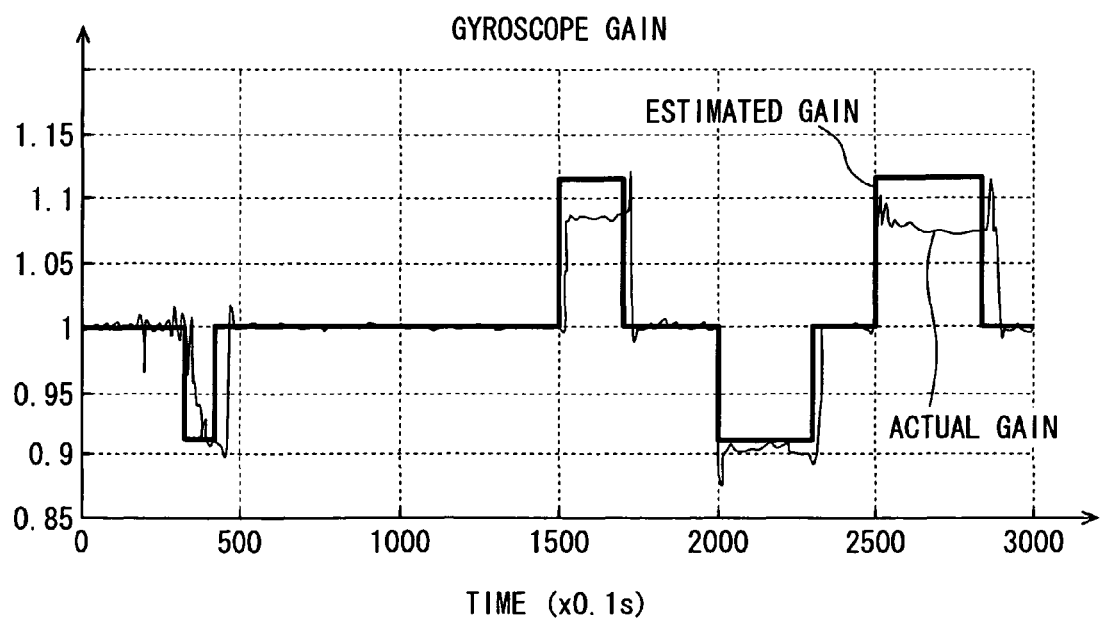

FIGS. 10A, 10B show results of the relation between an offset error and a correction amount and the relation between a gain error and an estimated value of the gyroscope 6 as comparative examples according to a conventional technique. FIG. 11 shows the equivalent results according to the embodiment. The conventional technique uses the same gain correction amount for the left and right turns. In the graphs, values showing smaller variations correspond to actual offset errors and actual gains.

The conventional technique cannot correctly estimate gains because the gain estimation for the turn is subject to an effect of a variation or deviation in the gain estimation for the straight travel. The embodiment correctly estimates gains because the gain correction amount is reset for the straight travel and the turn starts using the gain correction amount stored for the most recent turn. The conventional technique unsuccessfully separates an offset error from a gain error. A variation in the gain estimation for the turn is recognized to be an offset error. The offset correction amount largely deviates from the true value during the turn. The embodiment improves this problem and considerably suppresses variations in the offset correction amount during the turn.

(1-6. Effects)

As mentioned above, the navigation system 2 according to the first embodiment uses the Kalman filter to estimate a gain error of the gyroscope 6 and applies gain correction to the direction variation calculated based on an output from the gyroscope 6. The predetermined conversion gain may differ from an actual conversion ratio because the gyroscope is subject to temporal changes or is slantwise attached to the vehicle. In such case, the navigation system 2 can compensate a resulting error and accurately find not only a direction variation but also the present position or running direction of the vehicle.

The navigation system 2 stores the gain correction amount corresponding to a direction change when the gyroscope 6 contains different gain errors for the left and right turns. When the vehicle changes to the same direction again, the navigation system 2 assumes the stored gain correction amount to be an initial value. Specifically, the correction section 16 corrects the right gain correction amount based on a gain error when the vehicle is assumed to turn to the right. The correction section 16 corrects the left gain correction amount based on a gain error when the vehicle is assumed to turn to the left. The correction section 16 changes the gain correction amount used for the gain correction in chronological order depending on the running state or the turn direction of the vehicle.

The navigation system 2 corrects gains using the gain correction amount corresponding to the turn direction without independently estimating gain errors for the left and right turns using the Kalman filter. Compared to the conventional technique, the navigation system 2 does not increase variables for the state quantity. As a result, the navigation system 2 can more accurately estimate gain errors than the conventional technique that uses the same gain correction amount for the left and right turns.

(1-7. Functions)

In the first embodiment, the present position detecting device 10 performing the process at S410 through S480, S530, and S540, or more specifically the error estimation section 15, functions as an example of an error estimation means or portion. The present position detecting device 10 performing the process at S490, S510, and S520, or more specifically the error estimation section 15, functions as an example of a correction amount adjustment means or portion. The present position detecting device 10 performing the process at S500, or more specifically the correction section 16, functions as a turn direction determination means or portion.

2. Second Embodiment

The navigation system according to a second embodiment will be described.

The navigation system according to a second embodiment uses independent error covariance values of the Kalman filter for the right turn and the left turn.

An on-diagonal element in an error covariance matrix indicates the amount of errors in variables that are estimated using the Kalman filter. For example, the frequent right turn as a running vehicle state signifies that the right gain correction coefficient ϵS_right is accurately estimated but the left gain correction coefficient ϵS_left is not accurately corrected yet. When the vehicle turns to the left in this state, the process according to the first embodiment may unsuccessfully correct gains because of inconsistency between the left gain correction coefficient ϵS_left and the error covariance value.

The navigation system according to the second embodiment defines covariance Ps_right for right gyroscope gain errors and covariance Ps_left for left gyroscope gain errors. Ps denotes a diagonal element corresponding to the gain error in error covariance matrix P(t|t) (see equation (7) and FIG. 13).

Figure 9:
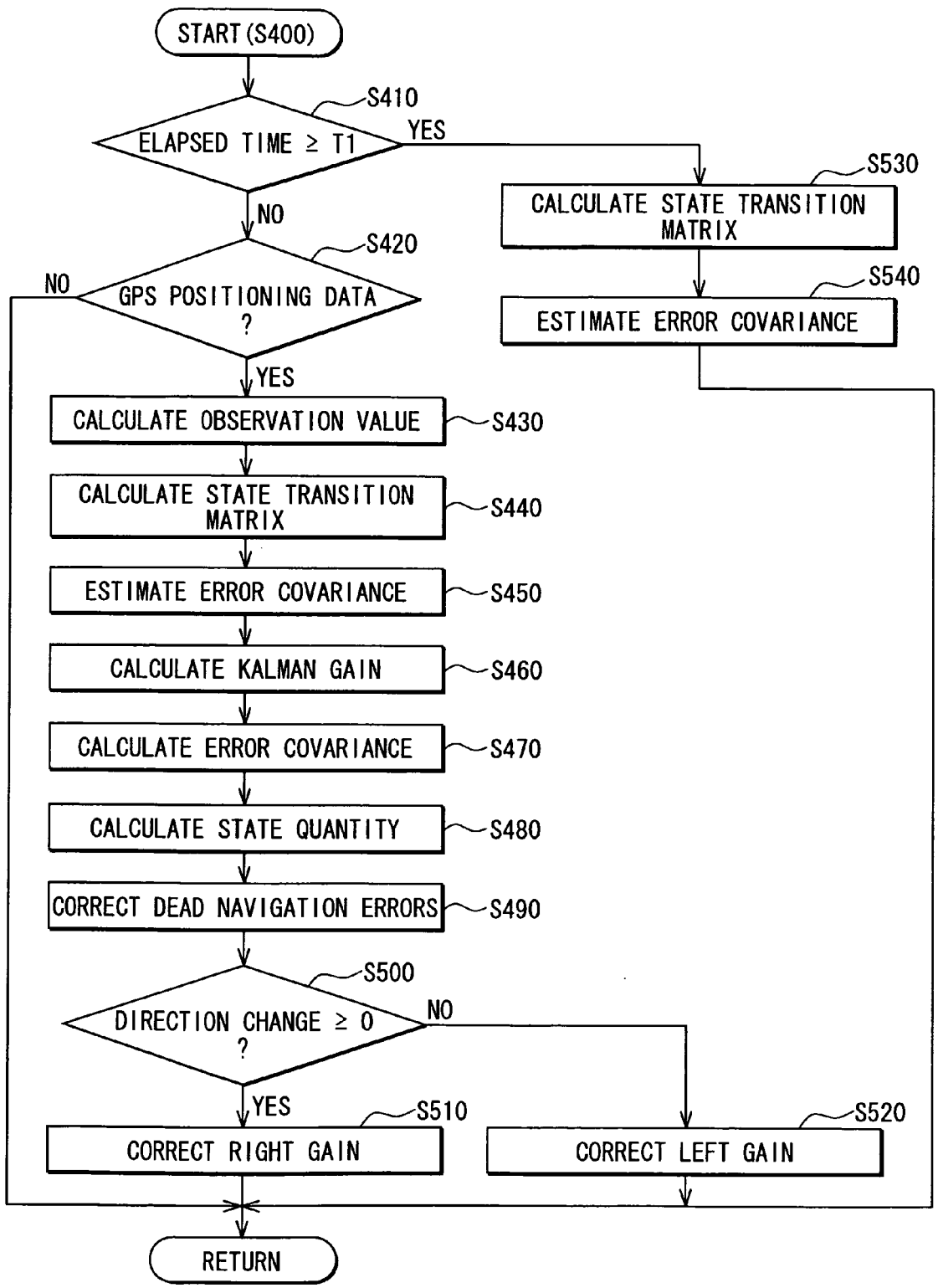
FIG. 9 is a flow chart showing a GPS combination process according to a first embodiment.
Figure 12:
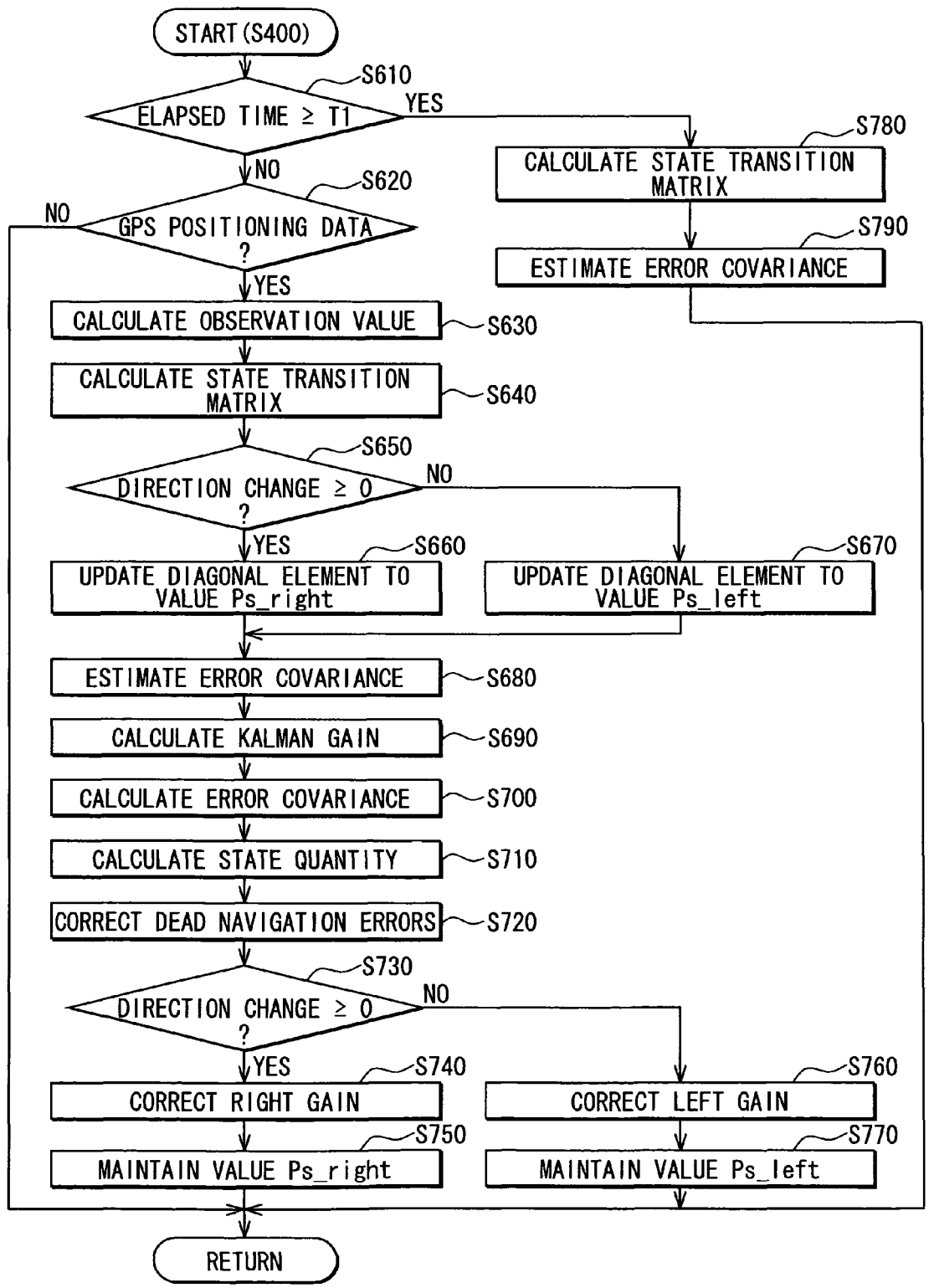
FIG. 12 is a flow chart showing a GPS combination process according to a second embodiment of the present invention.

The navigation system according to the second embodiment differs from the navigation system according to the first embodiment only in that a GPS combination process in FIG. 12 is performed instead of the GPS combination process in FIG. 9. The same parts or components are depicted by the same reference numerals and a description is omitted for simplicity.

When the GPS combination process in FIG. 12 performed by the navigation system according to the second embodiment is compared to the GPS combination process in FIG. 9 according to the first embodiment, S610 through S640, S680 through S740, S760, S780, and S790 of the second embodiment are equal to S410 through S540 of the first embodiment, respectively. The difference is addition of S650 through S670, S750, and S770 to the process of the first embodiment. The following describes only the added process steps.

At S650 through S670, the process selects one of value Ps_right dedicated to the right turn and value Ps_left dedicated to the left turn as an on-diagonal element corresponding to the gain error in the error covariance matrix P.

Specifically, at S650, the process determines whether or not a direction change in the vehicle is greater than or equal to 0, that is, whether or not the vehicle turns to the right. The determination result at S130 may be used as is.

When it is determined at S650 that the direction change in the vehicle is greater than or equal to 0 (right turn), the process proceeds to S660. The error covariance contains a diagonal element corresponding to the gain. The process updates that diagonal element to value Ps_right dedicated to the right turn. That is, the process replaces the on-diagonal element corresponding to the gain error $P(t-1|t-1)$ in equation (3) with Ps_right.

When it is determined at S650 that the direction change in the vehicle is smaller than 0 (left turn), the process proceeds to S670. The error covariance contains a diagonal element corresponding to the gain. The process updates that diagonal element to value Ps_left dedicated to the left turn. That is, the process replaces the on-diagonal element corresponding to the gain error $P(t-1|t-1)$ in equation (3) with Ps_left.

At S750, the process maintains the diagonal element of the error covariance corresponding to the gain or the value Ps_right dedicated to the right turn in this example. The value is stored in the memory. That is, the process maintains Ps_right as the on-diagonal element corresponding to the gain error $P(t|t)$ in equation (7).

At S770, the process maintains the diagonal element of the error covariance corresponding to the gain or the value Ps_left dedicated to the left turn in this example. The value is stored in the memory. That is, the process maintains Ps_left as the on-diagonal element corresponding to the gain error $P(t|t)$ in equation (7).

Initially, Ps_right and Ps_left are set to maximum values and then decrease as the accuracy improves with the repeated Kalman filter process. The values are maintained even when a vehicle engine stops, for example.

The navigation system 2 according to the second embodiment can successfully correct gains even when the vehicle is turning to a specific direction.

In the second embodiment, the present position detecting device 10 performing the process at S610 through S640, S660 through S710, S780, and S790, or more specifically the error estimation section 15, functions as an example of an error estimation means or portion. The present position detecting device 10 performing the process at S720, S740 through S770, or more specifically the correction section 16, functions as an example of a correction amount adjustment means or portion. The present position detecting device 10 perform-ing the process at S650 and S730, or more specifically the correction section 16, functions as an example of a turn direction determination means or portion.

3. Other Embodiments

While there have been described specific preferred embodiments of the present invention, it is to be distinctly understood that the present invention may be otherwise variously embodied.

For example, the GPS combination process in FIG. 12 of the second embodiment uses more processes than the GPS combination process in FIG. 9 of the first embodiment. To solve this problem, the GPS combination process in FIG. 12 may be performed under a condition where left and right gain errors are not fully estimated yet. The condition signifies that the right-gain or left-gain correction amount is greater than or equal to a specified threshold value. The GPS combination process in FIG. 12 may be changed to the GPS combination process in FIG. 9 when the left and right gain errors are fully estimated to show that the right-gain or left-gain correction amount is smaller than the specified threshold value. In addition, the GPS combination process in FIG. 9 may be changed to the GPS combination process in FIG. 12 when the right-gain or left-gain correction amount increases due to GPS accuracy degradation and becomes greater than or equal to the specified threshold value. This makes it possible to effectively reduce processing loads.

As shown in FIG. 13, value 0 may be assigned to the cross-correlation element corresponding to the gain error in the error covariance matrix P each time the process at S660 and S670 updates the value of the on-diagonal element corresponding to the gain error. The process can be stabilized.

When no left or right turn occurs for a long time, the gain error corresponding to the turn direction may increase. It may be preferable to increase an on-diagonal element value corresponding to the gain error in the right error covariance matrix with the lapse of time in which no right turn is determined. Likewise, it may be preferable to increase an on-diagonal element value corresponding to the gain error in the left error covariance matrix with the lapse of time in which no left turn is determined. Specifically, a given coefficient is used to gradually increase the on-diagonal element value with the lapse of time. This makes it possible to adjust the value to a corresponding gain correction amount even when no turn occurs for a long time and a gain error corresponding to that turn direction increases.

The above-mentioned embodiments determine the left or right turn. The invention however is not limited thereto. It may be preferable to determine the straight travel using steps 1 through 3 in the process to be described below. A gyroscope gain is equal to 1 for the straight travel, greater than or equal to 1 for the left turn, or smaller than or equal to 1 for the right turn.

As step 1, the process saves the presently estimated gain correction amount.

As step 2, the process detects a change in the running state. Specifically, the process determines the straight travel when a direction variation (a value after the offset and gain correction) for last three seconds is smaller than or equal to 10 deg/sec. The process determines a change to a turn from the straight travel when the direction variation for last one second is smaller than 10 deg/sec and the direction variation at that time is greater than or equal to 10 deg/sec.

As step 3, the process resets the gain to 1 for the straight travel as the running state. When the vehicle turns, the process uses the gain correction amount saved for the previous same running state as an initial value for the estimation.

An output voltage from the gyroscope 6 contains a noise. In the above-mentioned embodiments, the process (e.g., S130) to determine the left or right turn may frequently change the straight travel to the left or right turn. An approximately straight travel causes the gyroscope 6 to detect a small angular velocity. In such state, the Kalman filter is supplied with a small direction variation, making it difficult to provide the effect of Kalman filter gain correction. The left and right turn may be reversely corrected. It is therefore preferable to disable the correction of left and right sensitivities for an approximately straight travel.

Figure 16:
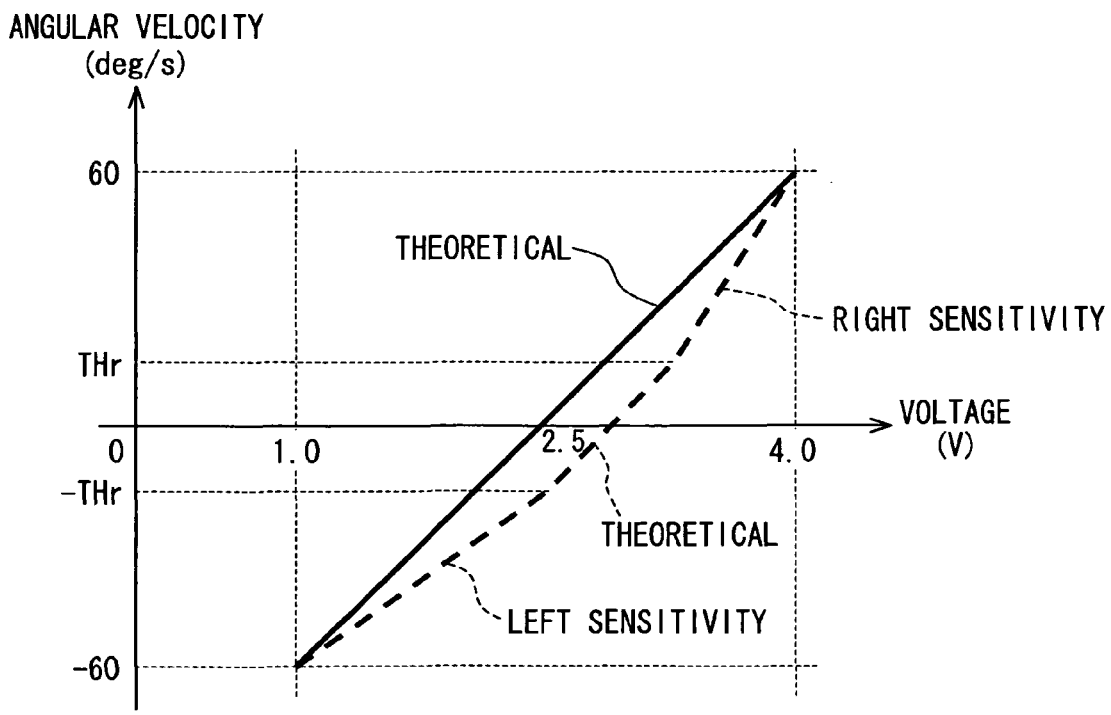
FIG. 16 is an explanatory diagram showing a modification that uses a theoretical value for a small turn amount.

Frequent changes may be inhibited to successfully estimate left and right gain errors during the straight travel. Specifically, as shown in FIG. 16, a threshold value THr [rad] is defined. The process for a small turn amount approximate to the straight travel uses a default gain (theoretical value) instead of the estimated left or right gain error. When the turn amount exceeds the threshold value THr or −THr, the left or right sensitivity is used for locus calculation and the Kalman filter is used for error estimation.

Figure 17:
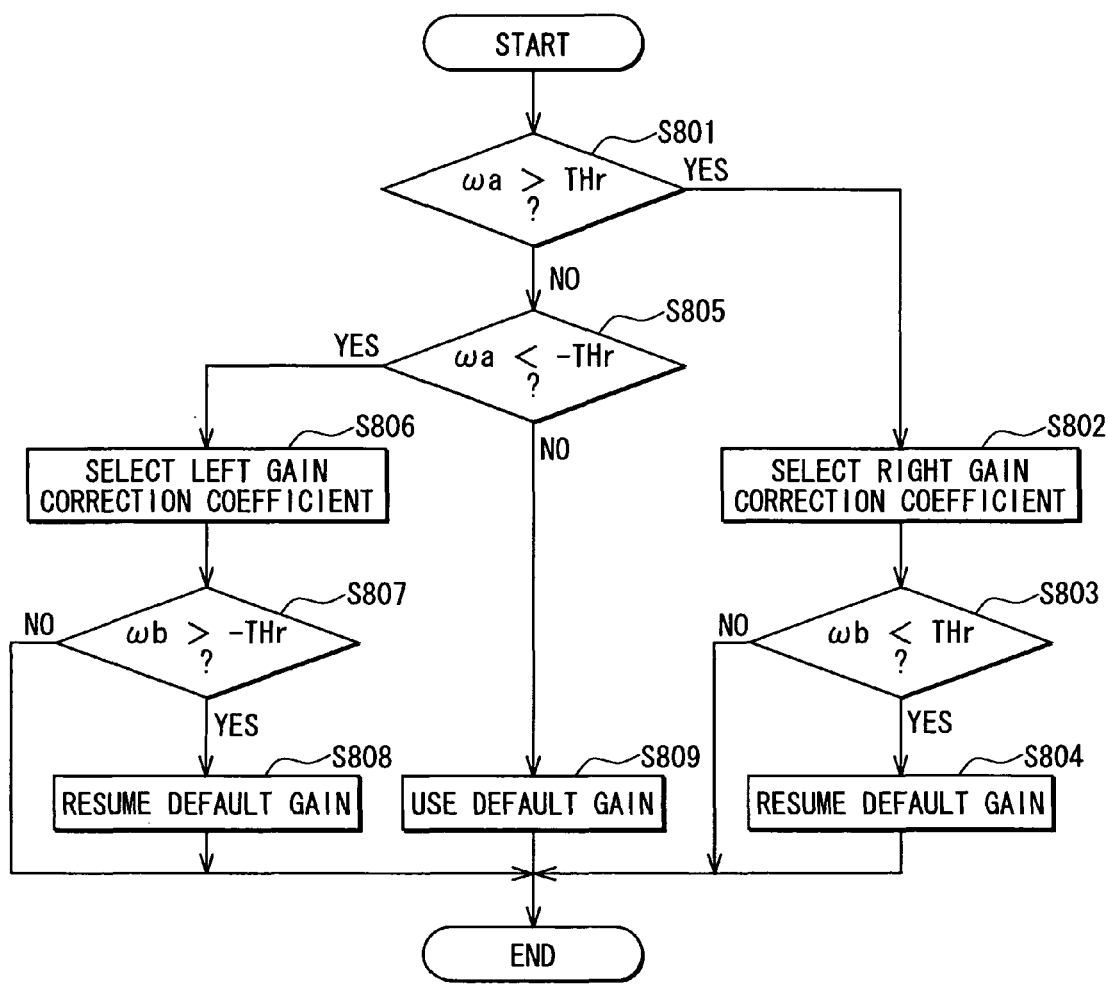
FIG. 17 is a flow chart showing a process of the modification in FIG. 16.

FIG. 17 shows a flow chart of the process. The process determines whether or not direction variation ωa for past Ta seconds from the present point exceeds the threshold value THr (S801). When it is determined that the direction variation ωa exceeds the threshold value THr to indicate the right turn (Yes at S801), the process selects the right gain correction coefficient or the right gain correction amount (S802). The process then determines whether or not direction variation ωb for past Tb seconds from the present point is smaller than the threshold value THr (S803). When it is determined that the direction variation ωb is smaller than the threshold value THr (Yes at S803), the process assumes the straight travel and resumes the default gain (S804).

When it is determined that the direction variation ωa does not exceed the threshold value THr (No at S801), the process determines whether or not the direction variation ωa is smaller than the threshold value −THr (S805). When it is determined that the direction variation ωa is smaller than the threshold value −THr to indicate the left turn (Yes at S805), the process selects the left gain correction coefficient or the left gain correction amount (S806). The process then determines whether or not the direction variation ωb for past Tb seconds from the present point exceeds the threshold value −THr (S807). When it is determined that the direction variation ωb for past Tb seconds from the present point exceeds the threshold value −THr (Yes at S807), the process assumes the straight travel and resumes the default gain (S808).

By contrast, it may be determined that the direction variation ωa is not smaller than the threshold value THr. That is, the direction variation ωa may be in the range of the threshold values between −THr and THr (No at S805). In this case, the process uses a default gain that is a theoretical value uniquely determined by the specification or the design of the gyroscope 6 (S809). When the default gain is provided, the left or right gain error is not estimated.

The threshold value THr may be fixed or dynamically changed. When the threshold value THr is dynamically changed, the process uses the root of an element corresponding to the gyroscope offset in the error covariance P(t|t) in equation (7). That is, the root of (1,1) for P(t|t) is used. The equation is shown below. In the equation, A and B are given constants.

$$THr = A\sqrt{(1,1) \text{ for } P(t|t)} + B$$

When (1,1) for P(t|t) is large, the gyroscope offset is not correctly estimated yet. The threshold value THr needs to be increased.

Each or any combination of processes, steps, or means explained in the above can be achieved as a software portion or section (e.g., subroutine) and/or a hardware portion or section (e.g., circuit or integrated circuit), including or not including a function of a related device; furthermore, the hardware portion or section can be constructed inside of a microcomputer.

Furthermore, the software portion or section or any combinations of multiple software portions or sections can be included in a software program, which can be contained in a computer-readable storage media or can be downloaded and installed in a computer via a communications network.

(Aspects)

Aspects of the disclosure described herein are set out in the following clauses.

As an aspect of the disclosure, a vehicular present position detection apparatus is provided as follows. In the apparatus, an angular velocity sensor detects an angular velocity of a vehicle. An error estimation portion is configured to assume a gain error of the angular velocity sensor to be a state quantity and find an estimated gain error using a Kalman filter. A turn direction determination portion is configured to determine a turn direction of the vehicle. A correction amount adjustment portion is configured to correct a gain correction amount used for gain correction of an angular velocity detected by the angular velocity sensor based on an estimated gain error found by the error estimation portion. Herein, the correction amount adjustment portion is configured to correct a first gain correction amount, which is dedicated to right turn, based on the estimated gain error when the turn direction determination portion determines a right turn; the correction amount adjustment portion is configured to correct a second gain correction amount, which is dedicated to left turn, based on the estimated gain error when the turn direction determination portion determines a left turn.

The vehicular present position detection apparatus changes the gain correction amount used for the gain correction in chronological order depending on the running state or the turn direction of the vehicle.

The vehicular present position detection apparatus corrects gains using the gain correction amount corresponding to the turn direction without independently estimating gain errors for the left and right turns using the Kalman filter. Compared to the conventional technique, the vehicular present position detection apparatus does not increase variables for the state quantity. As a result, the vehicular present position detection apparatus can more accurately estimate gain errors than the conventional technique that uses the same gain correction amount for the left and right turns.

An on-diagonal element corresponds to gain errors in the error covariance matrix for the state quantity found by using the Kalman filter and indicates the amount of gain errors. For example, the frequent right turn as a running vehicle state signifies that the gain correction amount dedicated to right turn is accurately estimated but the gain correction amount dedicated to left turn is not accurately estimated. When the vehicle turns to the left in this state, the gain correction may be unsuccessful due to inconsistency between the gain correction amount dedicated to left turn and the value in the error covariance matrix.

As an optional aspect of the vehicular present position detection apparatus, the error estimation portion may perform a covariance value change process. The covariance value change process may use a first value dedicated to right turn as an on-diagonal element when the turn direction determination portion determines a right turn. The covariance value change process may use a second value dedicated to left turn as an on-diagonal element when the turn direction determination portion determines a left turn. The on-diagonal element corresponds to the gain error in an error covariance matrix for a state quantity to be found by a Kalman filter.

The vehicular present position detection apparatus can successfully correct gains even when the vehicle is turning to a specific direction.

However, the covariance value change process necessitates an extra load.

As an optional aspect of the vehicular present position detection apparatus, the error estimation portion may perform the covariance value change process when the gain correction amount dedicated to right or left turn is greater than or equal to a specified threshold value. The vehicular present position detection apparatus can effectively reduce a processing load.

As an optional aspect, the error estimation portion may zero a value for a cross-correlation element corresponding to the gain error in the error covariance matrix when a value for the on-diagonal element corresponding to the gain error is updated. The process can be stabilized.

When no turn occurs for a long time, the gain error corresponding to the turn direction may increase.

As an optional aspect of the vehicular present position detection apparatus, the apparatus may increase the first value, which is used as the on-diagonal element and dedicated to right turn, in accordance with lapse of time during which the turn direction determination portion does not determine a right turn; and the apparatus may increase the second value, which is used as the on-diagonal element and dedicated to left turn, in accordance with lapse of time during which the turn direction determination portion does not determine a left turn.

The vehicular present position detection apparatus can adjust the value to a corresponding gain correction amount even when no turn occurs for a long time and a gain error corresponding to that turn direction increases.

As another aspect of the disclosure, a program storage medium containing instructions readable and executable by a computer, the instruction for causing the computer to function as the portions included in the above vehicular present position detection apparatus.

A program satisfying the above-mentioned requirements can allow a computer to function as the above vehicular present position detection apparatus and provide the above-mentioned effects.

As yet another aspect of the disclosure, a method is provided for controlling the above present position detection apparatus and similarly provides the above-mentioned effects.

It will be obvious to those skilled in the art that various changes may be made in the above-described embodiments of the present invention. However, the scope of the present invention should be determined by the following claims.

What is claimed is:

1. A vehicular present position detection apparatus comprising:
    an angular velocity sensor configured to detect an angular velocity of a vehicle;
    an error estimation portion configured to assume a gain error of the angular velocity sensor to be a state quantity and find an estimated gain error using a Kalman filter;
    a turn direction determination portion configured to determine a turn direction of the vehicle; and
    a correction amount adjustment portion configured to correct a gain correction amount used for gain correction of an angular velocity detected by the angular velocity sensor based on an estimated gain error found by the error estimation portion,
    the correction amount adjustment portion correcting a first gain correction amount, which is dedicated to right turn, based on the estimated gain error when the turn direction determination portion determines a right turn,
    the correction amount adjustment portion correcting a second gain correction amount, which is dedicated to left turn, based on the estimated gain error when the turn direction determination portion determines a left turn.

2. The vehicular present position detection apparatus according to claim 1, wherein
    the error estimation portion is further configured to perform a covariance value change process by using, as an on-diagonal element corresponding to the gain error in an error covariance matrix for a state quantity to be found by a Kalman filter,
    (i) a first value, which is dedicated to right turn, when the turn direction determination portion determines a right turn, and
    (ii) a second value, which is dedicated to left turn when the turn direction determination portion determines a left turn.

3. The vehicular present position detection apparatus according to claim 2,
    wherein the error estimation portion performs the covariance value change process when the first gain correction amount dedicated to right turn or the second gain correction amount dedicated to left turn is greater than or equal to a specified threshold value.

4. The vehicular present position detection apparatus according to claim 2,
    wherein the error estimation portion zeroes a value for a cross-correlation element corresponding to the gain error in the error covariance matrix when a value for the on-diagonal element is updated.

5. The vehicular present position detection apparatus according to claim 2, wherein:
    the apparatus increases the first value, which is used as the on-diagonal element and dedicated to right turn, in accordance with lapse of time during which the turn direction determination portion does not determine a right turn; and
    the apparatus increases the second value, which is used as the on-diagonal element and dedicated to left turn, in accordance with lapse of time during which the turn direction determination portion does not determine a left turn.

6. A program storage medium containing instructions readable and executable by a computer, the instruction for causing the computer to function as the portions included in the vehicular present position detection apparatus according to claim 1.

7. A method for adjusting a correction amount for an angular velocity sensor for a vehicle, the method comprising:
    assuming a gain error of the angular velocity sensor to be a state quantity and finding an estimated gain error using a Kalman filter;
    determining a turn direction of the vehicle; and
    correcting, based on the estimated gain error,
    (i) a first gain correction amount being dedicated to right turn, the first gain correction amount being used for gain correction of an angular velocity detected by the angular velocity sensor, when a turn direction is determined to be right turn, and
    (ii) a second gain correction amount being dedicated to left turn, the second gain correction amount being used for gain correction of an angular velocity detected by the angular velocity sensor, when a turn direction is determined to be left turn.

* * * * *